United States Patent
Lee et al.

(10) Patent No.: US 11,613,650 B2
(45) Date of Patent: Mar. 28, 2023

(54) THERMOPLASTIC RESIN COMPOSITION AND MOLDED ARTICLE FORMED THEREFROM

(71) Applicant: LOTTE CHEMICAL CORPORATION, Seoul (KR)

(72) Inventors: Seon Hui Lee, Uiwang-si (KR); Eric Arifin, Uiwang-si (KR); Min Soo Lee, Uiwang-si (KR); Bong Jae Lee, Uiwang-si (KR); Sang Hyun Hong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 304 days.

(21) Appl. No.: 16/957,453

(22) PCT Filed: Dec. 31, 2018

(86) PCT No.: PCT/KR2018/016970
§ 371 (c)(1),
(2) Date: Jun. 24, 2020

(87) PCT Pub. No.: WO2019/132629
PCT Pub. Date: Jul. 4, 2019

(65) Prior Publication Data
US 2020/0347228 A1    Nov. 5, 2020

(30) Foreign Application Priority Data

Dec. 31, 2017 (KR) .................. 10-2017-0185033

(51) Int. Cl.
| | |
|---|---|
| *C08L 81/06* | (2006.01) |
| *C08G 65/40* | (2006.01) |
| *C08K 7/14* | (2006.01) |
| *C08L 71/12* | (2006.01) |
| *C08G 75/23* | (2006.01) |
| *C08L 71/10* | (2006.01) |

(52) U.S. Cl.
CPC .......... *C08L 81/06* (2013.01); *C08G 65/4012* (2013.01); *C08K 7/14* (2013.01); *C08L 71/12* (2013.01)

(58) Field of Classification Search
None
See application file for complete search history.

(56) References Cited

U.S. PATENT DOCUMENTS

| | | |
|---|---|---|
| 2009/0048379 A1 | 2/2009 | Weinberg et al. |
| 2012/0100365 A1 | 4/2012 | Mutsuda |
| 2014/0008843 A1 | 1/2014 | Mutsuda |
| 2014/0322462 A1 | 10/2014 | Gautam et al. |
| 2014/0357782 A1 | 12/2014 | Gautam et al. |
| 2015/0259531 A1* | 9/2015 | El-Hibri ............. C08G 65/4012 525/471 |
| 2018/0258284 A1 | 9/2018 | Gautam et al. |

FOREIGN PATENT DOCUMENTS

| | | |
|---|---|---|
| CN | 102471571 A | 5/2012 |
| CN | 104125865 A | 10/2014 |
| CN | 105189654 A | 12/2015 |
| EP | 1884538 A1 | 2/2008 |
| EP | 2794759 A1 | 10/2014 |
| JP | 10-202786 A | 8/1998 |
| JP | 6169086 B | 8/1998 |
| KR | 10-2012-0037978 A | 4/2012 |
| KR | 10-1424828 B1 | 8/2014 |
| KR | 10-2014-0107466 A | 9/2014 |
| KR | 10-2015-0082498 A | 7/2015 |
| WO | 2013/092628 A1 | 6/2013 |
| WO | 2019/132629 A1 | 7/2019 |

OTHER PUBLICATIONS

Woo et al., "Glass transitions and Miscibility in Blends of Two or more Semicrystalline Polymers: Poly(aryl ether ketone) and Poly(ether ether ketone)," Journal of Polymer Science: Part B, vol. 37, pp. 1485-1494 (Year: 1998).*
International Search Report in counterpart International Application No. PCT/KR2018/016970 dated Apr. 9, 2019, pp. 1-8.
Extended Search Report in counterpart European Application No. 18896038.9 dated Aug. 5, 2021, pp. 1-5.
Office Action in counterpart Chinese Application No. 201880087602.1 dated Oct. 8, 2022, pp. 1-7.

* cited by examiner

*Primary Examiner* — Randy P Gulakowski
*Assistant Examiner* — Ha S Nguyen
(74) *Attorney, Agent, or Firm* — Additon, Pendleton & Witherspoon, P.A.

(57) ABSTRACT

A thermoplastic resin composition of the present invention comprises: about 5 wt % to about 35 wt % of a modified polyaryletherketone resin comprising a repeat unit represented by chemical formula 1; about 5 wt % to about 35 wt % of a polyether ether ketone resin; about 20 wt % to about 40 wt % of a polyphenylsulfone resin; and about 15 wt % to about 50 wt % of glass fibers. The thermoplastic resin composition has good properties in terms of adhesion to metals, impact resistance, and so on.

14 Claims, No Drawings

THERMOPLASTIC RESIN COMPOSITION AND MOLDED ARTICLE FORMED THEREFROM

CROSS-REFERENCE TO RELATED APPLICATIONS

This application claims priority to and the benefit of International Application No. PCT/KR2018/016970, filed Dec. 31, 2018, which published as WO 2019/132629 on Jul. 4, 2019, and Korean Patent Application No. 10-2017-0185033, filed in the Korean Intellectual Property Office on Dec. 31, 2017, the entire disclosure of each of which is incorporated herein by reference.

TECHNICAL FIELD

The present invention relates to a thermoplastic resin composition and a molded article formed of the same. More particularly, the present invention relates to a polyaryletherketone-based thermoplastic resin composition which has good properties in terms of adhesion to metals and impact resistance, and a molded article formed of the same.

BACKGROUND ART

Polyaryletherketone (PAEK) resins, such as polyether ether ketone (PEEK) resins, have good properties in terms of heat resistance, chemical resistance, rigidity, fatigue resistance, and the like, and thus are used in the field of office automation equipment and automobiles. However, polyaryletherketone resins are inadequate for use in various fields including a metal bonding material for portable devices, such as a smartphones, due to poor adhesion to metals and low impact resistance thereof.

In order to improve impact resistance of such a polyaryletherketone resin, there has been proposed a method of blending the polyaryletherketone resin with a polysulfone resin. However, this method has problems of deterioration in processability and adhesion to metals of the polyaryletherketone resin.

Therefore, there is a need for a polyaryletherketone-based thermoplastic resin composition which has good properties in terms of adhesion to metals and impact resistance.

The background technique of the present invention is disclosed in Japanese Patent No. 6169086 and the like.

DISCLOSURE

Technical Problem

It is one aspect of the present invention to provide a thermoplastic resin composition which has good properties in terms of adhesion to metals and impact resistance.

It is another aspect of the present invention to provide a molded article formed of the thermoplastic resin composition set forth above.

The above and other aspects of the present invention will become apparent from the detailed description of the following embodiments.

Technical Solution

1. One aspect of the present invention relates to a thermoplastic resin composition. The thermoplastic resin composition comprises: about 5 wt % to about 35 wt % of a modified polyaryletherketone resin including a repeat unit represented by Formula 1; about 5 wt % to about 35 wt % of a polyether ether ketone resin; about 20 wt % to about 40 wt % of a polyphenylsulfone resin; and about 15 wt % to about 50 wt % of glass fibers,

[Formula 1]

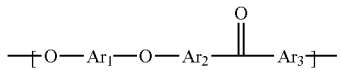

wherein $Ar_1$, $Ar_2$, and $Ar_3$ are each independently a phenyl group or a biphenyl group and at least one of $Ar_1$, $Ar_2$, and $Ar_3$ is a biphenyl group.

2. In Embodiment 1, the modified polyaryletherketone resin and the polyether ether ketone resin may be present in a weight ratio of about 1:0.2 to about 1:5.

3. In Embodiment 1 or 2, the modified polyaryletherketone resin may have a weight average molecular weight of about 50,000 g/mol to about 80,000 g/mol and a melting point of about 290° C. to about 330° C.

4. In Embodiments 1 to 3, the polyether ether ketone resin may contain a repeat unit represented by Formula 2:

[Formula 2]

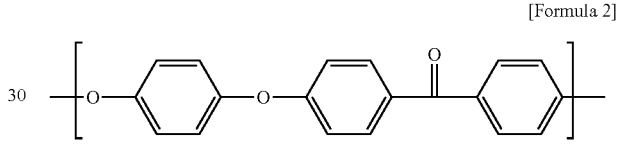

5. In Embodiments 1 to 4, the polyether ether ketone resin may have a weight average molecular weight of about 60,000 g/mol to about 90,000 g/mol and a melting point of about 330° C. to about 370° C.

6. In Embodiments 1 to 5, the polyphenylsulfone resin may contain a repeat unit represented by Formula 3:

[Formula 3]

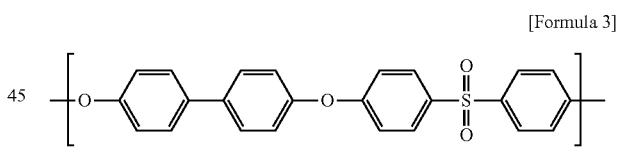

7. In Embodiments 1 to 6, the polyphenylsulfone resin may have a melt-flow index of about 10 g/10 min to about 30 g/10 min, as measured at a temperature of 360° C. under a load of 10 kgf in accordance with ASTM D1238.

8. In Embodiments 1 to 7, the thermoplastic resin composition may have a notched Izod impact strength of about 9 kgf·cm/cm to about 12 kgf·cm/cm, as measured on a ⅛" thick specimen in accordance with ASTM D256.

9. In Embodiments 1 to 8, the thermoplastic resin composition may have an impact strength of about 35 cm to about 80 cm, as determined by measuring a height from which dropping a 500 g dart results in breakage of 50% of the number of 2 mm thick specimens using a falling dart impact tester in a DuPont drop test.

10. In Embodiments 1 to 9, the thermoplastic resin composition may have an adhesion strength of about 35 MPa to about 55 MPa, as measured with respect to a metal in accordance with ISO 19095.

11. Another aspect of the present invention relates to a molded article. The molded article is formed of the thermoplastic resin composition according to any one of embodiments 1 to 10.

Advantageous Effects

The present invention provides a polyaryletherketone-based thermoplastic resin composition which has good properties in terms of adhesion to metals and impact resistance, and a molded article formed of the same.

BEST MODE

Hereinafter, embodiments of the present invention will be described in detail.

A thermoplastic resin composition according to the present invention comprises: (A) a modified polyaryletherketone resin; (B) a polyether ether ketone resin; (C) a polyphenylsulfone resin; and (D) glass fibers.

As used herein to represent a specific numerical range, the expression "a to b" means "≥a and ≤b".

(A) Modified Polyaryletherketone Resin

The modified polyaryletherketone resin according to the present invention serves to improve adhesion to metals and impact resistance of the thermoplastic resin composition in conjunction with the polyether ether ketone resin, and may comprise a polyaryletherketone resin including a repeat unit represented by Formula 1.

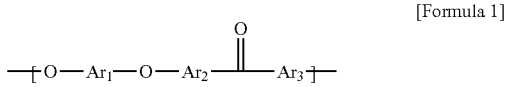

[Formula 1]

wherein $Ar_1$, $Ar_2$ and $Ar_3$ are each independently a phenyl group or a biphenyl group and at least one of $Ar_1$, $Ar_2$ and $Ar_3$ is a biphenyl group.

In some embodiments, the modified polyaryletherketone resin may have a weight average molecular weight (Mw) of about 50,000 g/mol to about 80,000 g/mol, for example, about 60,000 g/mol to about 70,000 g/mol, as measured by gel permeation chromatography (GPC). Within this range, the thermoplastic resin composition can have good processability and mechanical properties.

In some embodiments, the modified polyaryletherketone resin may have a melting point of about 290° C. to about 330° C., for example, about 300° C. to about 320° C., as measured at a heating rate of 20° C./min using a differential scanning calorimeter (DSC). Within this range, the thermoplastic resin composition can have good processability and flowability.

In some embodiments, the modified polyaryletherketone resin may be present in an amount of about 5 wt % to about 35 wt %, for example, about 10 wt % to about 30 wt %, based on the total weight of the thermoplastic resin composition. If the amount of the modified polyaryletherketone resin is less than about 5 wt %, the thermoplastic resin composition can have poor properties in terms of adhesion to metals, impact resistance, and processability, whereas, if the amount of the modified polyaryletherketone resin exceeds about 35 wt %, the thermoplastic resin composition can have poor properties in terms of processability and heat resistance.

(B) Polyether Ether Ketone Resin

The polyether ether ketone resin according to the present invention serves to improve adhesion to metals and impact resistance of the thermoplastic resin composition in conjunction with the modified polyaryletherketone resin, and may comprise a typical polyether ether ketone resin including a repeat unit represented by Formula 2.

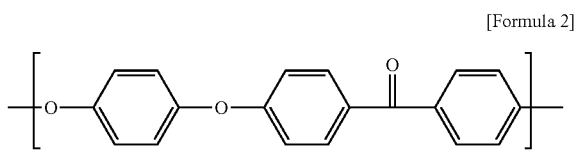

[Formula 2]

In some embodiments, the polyether ether ketone resin may have a weight average molecular weight (Mw) of about 60,000 g/mol to about 90,000 g/mol, for example, about 70,000 g/mol to about 80,000 g/mol, as measured by gel permeation chromatography (GPC). Within this range, the thermoplastic resin composition can have good processability and mechanical properties.

In some embodiments, the polyether ether ketone resin may have a melting point of about 330° C. to about 370° C., for example, about 340° C. to about 360° C., as measured at a heating rate of 20° C./min using a differential scanning calorimeter (DSC). Within this range, the thermoplastic resin composition can have good processability and mechanical properties.

In some embodiments, the polyether ether ketone resin may be present in an amount of about 5 wt % to about 35 wt %, for example, about 10 wt % to about 30 wt %, based on the total weight of the thermoplastic resin composition. If the amount of the polyether ether ketone resin is less than about 5 wt %, the thermoplastic resin composition can have poor properties in terms of adhesion to metals, impact resistance, and processability, whereas, if the amount of the polyether ether ketone resin exceeds about 35 wt %, the thermoplastic resin composition can have poor properties in terms of adhesion to metals and impact resistance.

In some embodiments, the modified polyaryletherketone resin (A) and the polyether ether ketone resin (B) may be present in a weight ratio (A:B) of about 1:0.2 to about 1:5, for example, about 1:0.3 to about 1:3. Within this range, the thermoplastic resin composition can have good properties in terms of adhesion to metals and impact resistance.

(C) Polyphenylsulfone Resin

The polyphenylsulfone resin according to the present invention serves to improve impact resistance of the thermoplastic resin composition, and may comprise a polyphenylsulfone resin including a repeat unit represented by Formula 3.

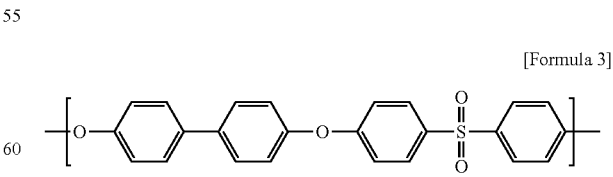

[Formula 3]

In some embodiments, the polyphenylsulfone resin may have a melt-flow index of about 10 g/10 min to about 30 g/10 min, for example, about 15 g/10 min to about 25 g/10 min, as measured at a temperature of 360° C. under a load of 10 kgf in accordance with ASTM D1238. Within this range, the thermoplastic resin composition can have good properties in terms of impact resistance, processability, and adhesion to metals.

In some embodiments, the polyphenylsulfone resin may be present in an amount of about 20 wt % to about 40 wt %, for example, about 25 wt % to about 35 wt %, based on the total weight of the thermoplastic resin composition. If the amount of the polyphenylsulfone resin is less than about 20 wt %, the thermoplastic resin composition can have poor properties in terms of impact resistance and processability, whereas, if the amount of the polyphenylsulfone resin exceeds about 40 wt %, the thermoplastic resin composition can have poor adhesion to metals and poor mechanical properties.

(D) Glass Fibers

The glass fibers according to one embodiment of the present invention serve to improve mechanical properties of the thermoplastic resin composition, such as rigidity, and may comprise glass fibers used in typical thermoplastic resin compositions.

In some embodiments, the glass fibers may have various shapes, such as fibrous, particle, rod-like, needle-like, flake, and amorphous shapes, and may have various cross-sections, such as circular, elliptical, and rectangular cross-sections. For example, it may be desirable to use fibrous glass fibers having circular and/or rectangular cross-sections in terms of mechanical properties.

In some embodiments, the circular cross-section glass fibers may have a cross-sectional diameter of about 5 μm to about 20 μm and a pre-processing length of about 2 mm to about 20 mm, and the rectangular cross-section glass fibers may have a cross-sectional aspect ratio (a ratio of cross-sectional major diameter to cross-sectional minor diameter) of about 1.5 to about 10, a cross-sectional minor diameter of about 2 μm to about 10 μm, and a pre-processing length of about 2 mm to about 20 mm. Within this range, the thermoplastic resin composition can have good properties in terms of rigidity and processability.

In some embodiments, the glass fibers may be present in an amount of about 15 wt % to about 50 wt %, for example, about 20 wt % to about 40 wt %, based on the total weight of the thermoplastic resin composition. If the amount of glass fibers is less than about 15 wt %, the thermoplastic resin composition can have poor mechanical properties, whereas, if the amount of glass fibers exceeds about 50 wt %, the thermoplastic resin composition can have poor properties in terms of processability and flowability.

The thermoplastic resin composition according to one embodiment of the present invention may further comprise additives used in typical thermoplastic resin compositions. Examples of the additives may include flame retardants, fillers, antioxidants, anti-dripping agents, lubricants, release agents, nucleating agents, heat stabilizers, UV stabilizers, pigments, dyes, and combinations thereof. When used in the thermoplastic resin composition, the additives may be present in an amount of about 0.001 parts by weight to about 40 parts by weight, for example, about 0.1 parts by weight to about 20 parts by weight, relative to about 100 parts by weight of the thermoplastic resin composition.

The thermoplastic resin composition according to the present invention may be prepared in pellet form by mixing the aforementioned components, followed by melt extrusion in a typical twin-screw extruder at about 250° C. to about 400° C., for example, about 320° C. to about 400° C.

In some embodiments, the thermoplastic resin composition may have a notched Izod impact strength of about 9 kgf·cm/cm to about 12 kgf·cm/cm, as measured on a ⅛" thick specimen in accordance with ASTM D256.

In some embodiments, the thermoplastic resin composition may have an impact strength of about 35 cm to about 80 cm, as determined by measuring a height from which dropping a 500 g dart results in breakage of 50% of the number of 2 mm thick specimens using a falling dart impact tester in a DuPont drop impact test.

In some embodiments, the thermoplastic resin composition may have an adhesion strength of about 35 MPa to about 55 MPa, as measured with respect to a metal in accordance with ISO 19095.

A molded article according to the present invention is formed of the thermoplastic resin composition set forth above. The thermoplastic resin composition may be prepared in pellet form. The prepared pellets may be produced into various molded articles (products) by various molding methods, such as injection molding, extrusion, vacuum forming, and casting. These molding methods are well known to those skilled in the art. The molded article according to the present invention has good properties in terms of adhesion to metals and impact resistance, and thus is useful as a metal bonding material for portable devices, such as smartphones.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(A) Modified Polyaryletherketone Resin

A biphenyl group-containing modified polyaryletherketone resin (manufacturer: Victrex, product name: EEG-108, weight average molecular weight: about 67,000 g/mol, melting point: about 310° C.) was used.

(B) Polyether Ether Ketone Resin

A polyether ether ketone resin (manufacturer: Victrex, product name: 150P, weight average molecular weight: about 74,000 g/mol, melting point: about 345° C.) was used.

(C) Polyphenylsulfone Resin

A polyphenylsulfone resin (manufacturer: BASF, product name: P3010, MI (360° C., 10 kgf): about 20 g/10 min) was used.

(D) Glass Fibers

Rectangular Cross-Section Glass Fibers (Manufacturer: Nitto Boseki, Product name: CSG 3PA-820) were used.

Examples 1 to 3 and Comparative Examples 1 to 3

The aforementioned components were mixed in amounts as listed in Table 1, followed by extrusion at 360° C., thereby preparing a thermoplastic resin composition in pellet form. Here, extrusion was performed using a twin-screw extruder (L/D: 36, Φ: 45 mm). The prepared pellets were dried at 100° C. for 4 hours or more and then subjected to injection molding using a 6 oz. injection machine (molding temperature: 230° C., mold temperature: 60° C.), thereby preparing a specimen. The prepared specimen was evaluated as to the following properties. Results are shown in Table 1.

Property Evaluation (1) Notched Izod impact strength (unit: kgf·cm/cm): Notched Izod impact strength was measured on a ⅛" thick Izod specimen in accordance with ASTM D256.

(2) Plane impact strength (unit: cm): Plane impact strength was determined by measuring a height (unit: cm) from which dropping a 500 g dart results in breakage of 50% of the number of 2 mm thick specimens using a falling dart impact tester in a DuPont drop test.

(3) Adhesion strength to metal (unit: MPa): In accordance with ISO 19095, the thermoplastic resin composition was subjected to insert injection molding in the presence of a metal specimen to prepare an adhesion test specimen in which the metal specimen and the thermoplastic resin composition specimen were bonded to each other, followed by measurement of adhesion strength between the metal specimen and the thermoplastic resin composition specimen. Here, as the metal specimen, a metal specimen subjected to TRI surface treatment (Geo Nation Co., Ltd.) to facilitate bonding with the resin composition specimen was used. In addition, each of the metal specimen and the thermoplastic resin composition specimen had a size of 1.2 cm×4 cm×0.3 cm, and the adhesion test specimen had a size of 1.2 cm×8 cm×0.3 cm, that is, had a shape in which a 1.2 cm×0.3 cm surface of the metal specimen was attached to a 1.2 cm×0.3 cm surface of the thermoplastic resin composition specimen. A tensile test was conducted on the adhesion test specimen to measure adhesion strength between the metal specimen and the thermoplastic resin composition specimen.

TABLE 1

|  | Example | | | Comparative Example | | |
|---|---|---|---|---|---|---|
|  | 1 | 2 | 3 | 1 | 2 | 3 |
| (A) (wt %) | 10 | 20 | 30 | 1 | 39 | — |
| (B) (wt %) | 30 | 20 | 10 | 39 | 1 | 40 |
| (C) (wt %) | 30 | 30 | 30 | 30 | 30 | 30 |
| (D) (wt %) | 30 | 30 | 30 | 30 | 30 | 30 |
| Notched Izod impact strength (kgf · cm/cm) | 9.4 | 10.1 | 10.6 | 8.5 | 12 | 8.4 |
| Plane impact strength (cm) | 38 | 51 | 66 | 32 | 70 | 32 |
| Adhesion strength to metal (MPa) | 50 | 53 | 51 | 45 | 32 | 48 |

From the results shown in Table 1, it can be seen that the thermoplastic resin composition according to the present invention had good properties in terms of adhesion to metals and impact resistance.

Conversely, the thermoplastic resin composition of Comparative Example 1, in which the modified polyaryletherketone resin was used in an amount less than the range according to the present invention and the polyether ether ketone resin was used in an amount exceeding the range according to the present invention, had poor impact strength (notched Izod impact strength, plane impact strength), and the thermoplastic resin composition of Comparative Example 2, in which the modified polyaryletherketone resin was used in an amount exceeding the range according to the present invention and the polyether ether ketone resin was used in an amount less than the range according to the present invention, had poor properties in terms of adhesion to metals. In addition, the thermoplastic resin composition of Comparative Example 3, free from the modified polyaryletherketone resin, had poor impact strength (notched Izod impact strength, plane impact strength).

It should be understood that various modifications, changes, alterations, and equivalent embodiments can be made by those skilled in the art without departing from the spirit and scope of the invention.

The invention claimed is:

1. A thermoplastic resin composition comprising:
   about 5 wt % to about 35 wt % of a modified polyaryletherketone resin comprising a repeat unit represented by Formula 1:

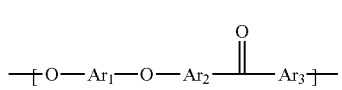

[Formula 1]

wherein $Ar_1$, $Ar_2$, and $Ar_3$ are each independently a phenyl group or a biphenyl group and at least one of $Ar_1$, $Ar_2$, and $Ar_3$ is a biphenyl group, wherein the modified polyaryletherketone resin has a weight average molecular weight of about 50,000 g/mol to about 80,000 g/mol and a melting point of about 290° C. to about 330° C.;
   about 5 wt % to about 35 wt % of a polyether ether ketone resin;
   about 20 wt % to about 40 wt % of a polyphenylsulfone resin; and
   about 15 wt % to about 50 wt % of glass fibers.

2. The thermoplastic resin composition according to claim 1, wherein the modified polyaryletherketone resin and the polyether ether ketone resin are present in a weight ratio of about 1:0.2 to about 1:5.

3. The thermoplastic resin composition according to claim 1, wherein the polyether ether ketone resin comprises a repeat unit represented by Formula 2:

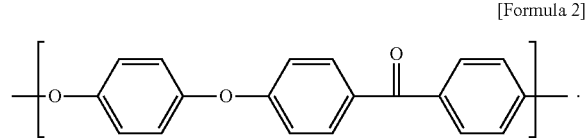

[Formula 2]

4. The thermoplastic resin composition according to claim 1, wherein the polyether ether ketone resin has a weight average molecular weight of about 60,000 g/mol to about 90,000 g/mol and a melting point of about 330° C. to about 370° C.

5. The thermoplastic resin composition according to claim 1, wherein the polyphenylsulfone resin comprises a repeat unit represented by Formula 3:

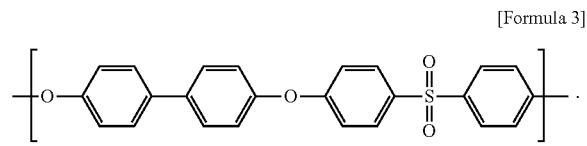

[Formula 3]

6. The thermoplastic resin composition according to claim 1, wherein the polyphenylsulfone resin has a melt-flow index of about 10 g/10 min to about 30 g/10 min, as measured at a temperature of 360° C. under a load of 10 kgf in accordance with ASTM D1238.

7. The thermoplastic resin composition according to claim 1, wherein the thermoplastic resin composition has a notched Izod impact strength of about 9 kgf cm/cm to about 12 kgf cm/cm, as measured on a 1/8" thick specimen in accordance with ASTM D256.

8. The thermoplastic resin composition according to claim 1, wherein the thermoplastic resin composition has an impact strength of about 35 cm to about 80 cm, as determined by measuring a height from which dropping a 500 g dart results in breakage of 50% of the number of 2 mm thick specimens using a falling dart impact tester in a DuPont drop test.

9. The thermoplastic resin composition according to claim 1, wherein the thermoplastic resin composition has an adhesion strength of about 35 MPa to about 55 MPa, as measured with respect to a metal in accordance with ISO 19095.

10. A molded article formed of the thermoplastic resin composition according to claim 1.

11. A thermoplastic resin composition comprising:
about 5 wt % to about 35 wt % of a modified polyaryletherketone resin comprising a repeat unit represented by Formula 1:

[Formula 1]

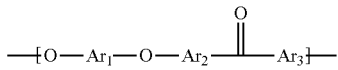

wherein $Ar_1$, $Ar_2$, and $Ar_3$ are each independently a phenyl group or a biphenyl group and at least one of $Ar_1$, $Ar_2$, and $Ar_3$ is a biphenyl group;
about 5 wt % to about 35 wt % of a polyether ether ketone resin, wherein the polyether ether ketone resin has a weight average molecular weight of about 60,000 g/mol to about 90,000 g/mol and a melting point of about 330° C. to about 370° C.;
about 20 wt % to about 40 wt % of a polyphenylsulfone resin; and
about 15 wt % to about 50 wt % of glass fibers.

12. A thermoplastic resin composition comprising:
about 5 wt % to about 35 wt % of a modified polyaryletherketone resin comprising a repeat unit represented by Formula 1:

[Formula 1]

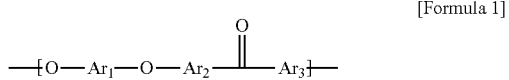

wherein $Ar_1$, $Ar_2$, and $Ar_3$ are each independently a phenyl group or a biphenyl group and at least one of $Ar_1$, $Ar_2$, and $Ar_3$ is a biphenyl group;
about 5 wt % to about 35 wt % of a polyether ether ketone resin;
about 20 wt % to about 40 wt % of a polyphenylsulfone resin; and
about 15 wt % to about 50 wt % of glass fibers,
wherein the thermoplastic resin composition has a notched Izod impact strength of about 9 kgf·cm/cm to about 12 kgf·cm/cm, as measured on a 1/8" thick specimen in accordance with ASTM D256.

13. The thermoplastic resin composition according to claim 12, wherein the thermoplastic resin composition has an impact strength of about 35 cm to about 80 cm, as determined by measuring a height from which dropping a 500 g dart results in breakage of 50% of the number of 2 mm thick specimens using a falling dart impact tester in a DuPont drop test.

14. The thermoplastic resin composition according to claim 13, wherein the thermoplastic resin composition has an adhesion strength of about 35 MPa to about 55 MPa, as measured with respect to a metal in accordance with ISO 19095.

* * * * *